(12) United States Patent
Kamran et al.

(10) Patent No.: US 10,838,863 B2
(45) Date of Patent: Nov. 17, 2020

(54) STORAGE SYSTEM WITH WRITE CACHE RELEASE PROTECTION

(71) Applicant: EMC IP Holding Company LLC, Hopkinton, MA (US)

(72) Inventors: Lior Kamran, Rishon LeZion (IL); Vladimir Shveidel, Pardes-Hana (IL); David Krakov, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 16/265,131

(22) Filed: Feb. 1, 2019

(65) Prior Publication Data

US 2020/0250089 A1    Aug. 6, 2020

(51) Int. Cl.
*G06F 12/00* (2006.01)
*G06F 12/0804* (2016.01)

(52) U.S. Cl.
CPC .. *G06F 12/0804* (2013.01); *G06F 2212/1032* (2013.01); *G06F 2212/608* (2013.01)

(58) Field of Classification Search
CPC ......... G06F 12/0804; G06F 2212/1032; G06F 2212/608; G06F 3/0656; G06F 13/1673
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,552,258 B2 | 1/2017 | Hallak et al. |
| 9,606,870 B1 | 3/2017 | Meiri et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — John A Lane
(74) *Attorney, Agent, or Firm* — Ryan, Mason & Lewis, LLP

(57) ABSTRACT

A storage system in one embodiment comprises a plurality of storage devices and at least one processing device. In conjunction with destaging data corresponding to an entry in a write cache, the at least one processing device determines a value of a release indication of an entry in a destage data structure that corresponds to the entry in the write cache. Responsive to determining that the value is a first value, the at least one processing device adds an entry that corresponds to the entry in the write cache to a release data structure. The storage system polls the release data structure and releases entries in the write cache that correspond to entries found in the release data structure. Responsive to determining that the value is a second value, an entry corresponding to the entry in the write cache is not added to the release data structure.

20 Claims, 12 Drawing Sheets

(56) References Cited

U.S. PATENT DOCUMENTS

| | | | |
|---|---|---|---|
| 9,704,583 B2* | 7/2017 | Song | G11C 16/10 |
| 9,716,754 B2 | 7/2017 | Swift | |
| 9,753,655 B2* | 9/2017 | Yin | G06F 3/0673 |
| 10,649,906 B2* | 5/2020 | Simionescu | G06F 12/0888 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0181016 A1 | 6/2014 | Whitehead et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0192857 A1 | 7/2017 | Meiri et al. | |
| 2019/0129848 A1* | 5/2019 | Hu | G06F 3/061 |
| 2019/0179751 A1* | 6/2019 | Kanno | G06F 12/0804 |
| 2020/0264805 A1* | 8/2020 | Yoshii | G06F 11/1068 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pges.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

US 10,838,863 B2

STORAGE SYSTEM WITH WRITE CACHE RELEASE PROTECTION

FIELD

The field relates generally to information processing systems, and more particularly to storage in information processing systems.

BACKGROUND

In some information processing systems, volatile write cache temporarily stores or caches data to be later written to a persistent data storage location (i.e., destaged) during a background destaging process. During the destaging process, the data is "hardened" by, for example, reading the data from the write cache and storing the data in the persistent data storage location. A received write request is considered a pending or "inflight" write request prior to its data being stored in the persistent data storage location, e.g., while waiting to be processed or being processed in the destaging process.

SUMMARY

Illustrative embodiments provide techniques for write cache release protection in a storage system.

In one embodiment, a storage system comprises a plurality of storage devices and at least one processing device coupled to memory. In conjunction with destaging data corresponding to an entry in a write cache to one or more of the plurality of storage devices, the at least one processing device is configured to determine a value of a release indication of an entry in a destage data structure, where the entry in the destage data structure corresponds to the entry in the write cache. Responsive to determining that the value of the release indication is a first value, the at least one processing device is further configured to add an entry that corresponds to the entry in the write cache to a release data structure. The storage system is configured to poll the release data structure and to release entries in the write cache that correspond to entries found in the release data structure by the polling. Responsive to determining that the value of the release indication is a second value, an entry corresponding to the entry in the write cache is not added to the release data structure.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
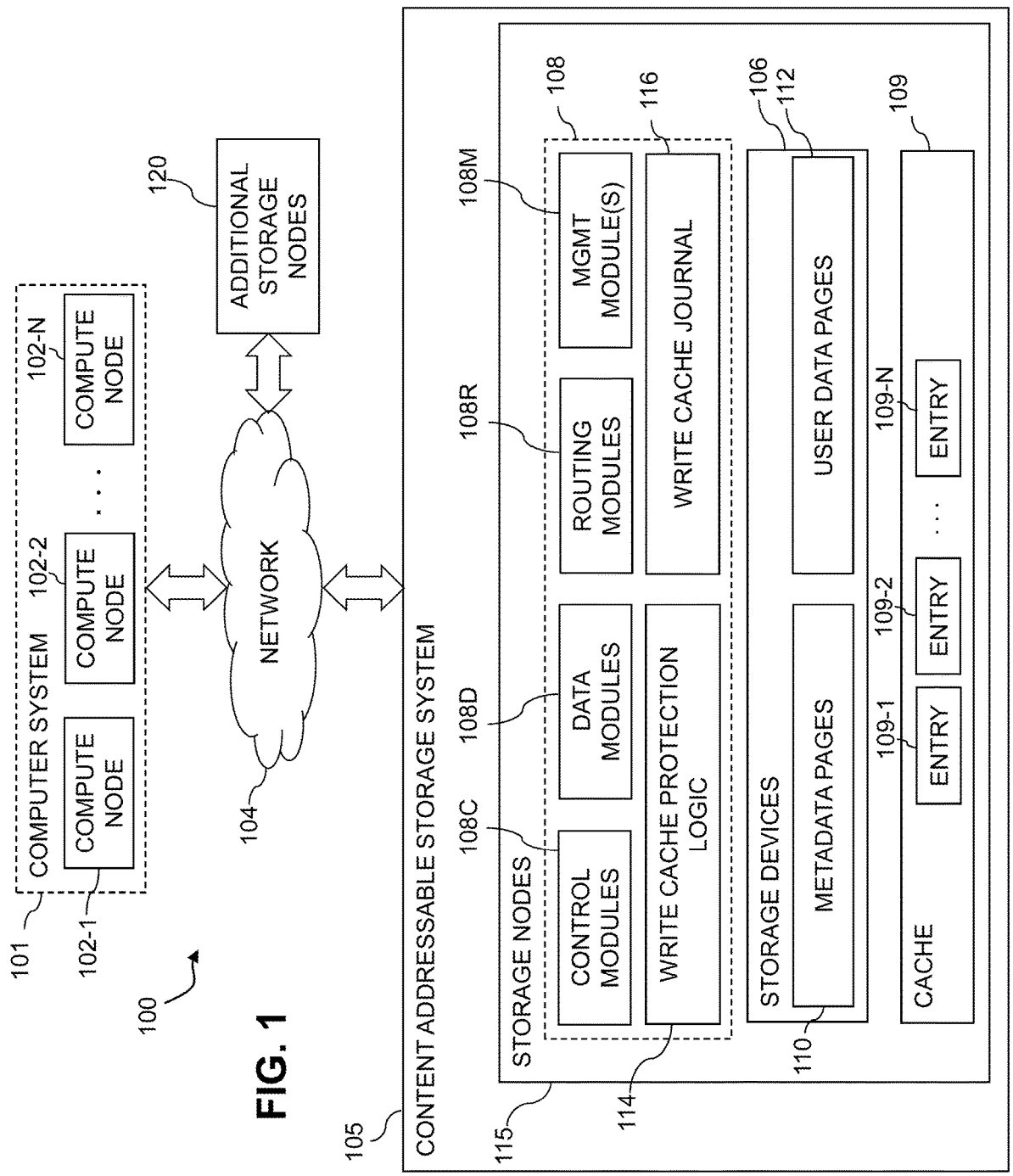
FIG. 1 is a block diagram of an information processing system comprising a content addressable storage system configured with functionality for write cache release protection in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

Such users of the storage system 105 in some cases are referred to herein as respective "clients" of the storage system 105.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106, an associated storage controller 108, and an associated cache 109. The storage devices 106 are configured to store metadata pages 110 and user data pages 112, and may also store additional information not explicitly shown such as, e.g., checkpoints, reference counts, and journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area.

Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used. In some aspects, the hash metadata may also be loaded into cache 109.

Each of the metadata pages 110 characterizes a plurality of the user data pages 112. For example, a given set of user data pages 112 representing a portion of the user data pages 112 illustratively comprises a plurality of user data pages. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages. Each metadata page 110 has a respective signature and characterizes a different set of user data pages. For example, the characterizing information in each metadata page can include the LUN identifiers, offsets and content-based signatures for each of the user data pages that are characterized by that metadata page. It is to be appreciated, however, that the above described user data and metadata page configurations are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for write cache release protection in the content addressable storage system 105.

As noted above, the storage devices 106 are configured to store user data pages 112 and metadata pages 110 in respective user data page and metadata page areas. Each of the user data pages 112 comprises a logical address and a content-based signature derived from content of that data page, and each of the metadata pages 110 characterizes a plurality of the user data pages 112 and associates the content-based signatures of those user data pages with respective physical blocks in the storage devices 106.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

Ownership of a user data logical address space within the content addressable storage system 105 is illustratively distributed among the control modules 108C.

The cache 109 of storage system 105 in the FIG. 1 embodiment includes write cache entries 109-1, 109-2, . . . , 109-N which store incoming input-output (IO) request data for later destaging to storage devices 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108. In some embodiments, the caches 109 of each storage node 115 may operate together as a single cache 109 of the content addressable storage system 105 where the components of a given storage node 115 may access any portion of the cache 109 including those portions included as components of other storage nodes 115.

It is desirable in these and other storage system contexts to implement functionality for write cache release protection across multiple distributed processing modules, such as the processing modules 108C, 108D, 108R and 108M of the distributed storage controller 108.

The storage controller 108 may include write cache release protection logic 114, e.g., as part of management module 108M, that engages corresponding control logic instances in the control modules 108C, routing modules 108R and data modules 108D in order to implement processes for write cache release protection within the system 100, as will be described in more detail below in conjunction with FIGS. 8-10.

The storage controller 108 may also include a persistent write cache journal 116, e.g., as part of control module 108C, which is utilized by the control module 108C to persistently log and track the state of the write cache portion of cache 109. The write cache journal 116 is stored in persistent NVM such as, e.g., flash memory, NVRAM, PC-RAM, MRAM, or other NVM memory. Various combinations of multiple different types of NVM devices may also be used to store the write cache journal. In some embodiments, write cache journal 116 may also or alternatively be stored on storage devices 106, e.g., on an SSD.

In some embodiments, the content addressable storage system 105 comprises an XtremIO™ storage array suitably modified to incorporate techniques for write cache release protection as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise write cache release protection logic 114, although other types and arrangements of system-wide management modules can be used in other embodiments. Accordingly, functionality for write cache release protection in some embodiments is implemented under the control of write cache release protection logic 114 of the distributed storage controller 108, utilizing the C-modules, D-modules and R-modules of the XtremIO™ storage array.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Each of the storage nodes 115 of the storage system 105 comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

The term "write request" as used herein is intended to be broadly construed, so as to encompass one or more IO operations directing that at least one data item of a storage system be written to in a particular manner. A given write request is illustratively received in a storage system from a host device. For example, in some embodiments, a write request is received in a distributed storage controller of the storage system, and directed from one processing module to another processing module of the distributed storage controller. More particularly, in the embodiments to be described below in conjunction with FIGS. 8-10, a received write request is directed from a routing module of the distributed storage controller to a particular control module of the distributed storage controller. The write request is stored in the write cache portion of cache 109, stored in the write cache journal 116, acknowledged, and subsequently destaged at a later time to a persistent data storage location on one or more of storage devices 106. Other arrangements for receiving and processing write requests from one or more host devices can be used.

Communications between control modules 108C and routing modules 108R of the distributed storage controller 108 may be performed in a variety of ways. An example embodiment is implemented in the XtremIO™ context, and the C-modules, D-modules and R-modules of the storage nodes 115 in this context are assumed to be configured to communicate with one another over a high-speed internal network such as an InfiniBand network. The C-modules, D-modules and R-modules coordinate with one another to accomplish various IO processing tasks.

The logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

The manner in which functionality for write cache release protection is provided in the FIG. 1 embodiment will now be described. The process is assumed to be carried out by the processing modules 108C, 108D, 108R and 108M. It is further assumed that the control modules 108C temporarily store data pages in the cache 109 of the content addressable storage system 105 and later destage the temporarily stored data pages via the data modules 108D in accordance with write requests received from host devices via the routing modules 108R. The host devices illustratively comprise respective ones of the compute nodes 102 of the computer system 101.

The write requests from the host devices identify particular data pages to be written in the storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 105 utilizes a two-level mapping process to map logical block addresses to physical block addresses. The first level of mapping uses an address-to-hash ("A2H") table and the second level of mapping uses a hash-to-physical ("H2P") table, sometimes known as a hash metadata ("HMD") table, with the A2H and H2P tables corresponding to respective logical and physical layers of the content-based signature mapping within the storage system 105.

The first level of mapping using the A2H table associates logical addresses of respective data pages with respective content-based signatures of those data pages. This is also referred to as logical layer mapping.

The second level of mapping using the H2P table associates respective ones of the content-based signatures with respective physical storage locations in one or more of the storage devices 106. This is also referred to as physical layer mapping.

For a given write request, both of the corresponding A2H and H2P tables are updated in conjunction with the processing of that write request. For example, the A2H table may be updated when the page data for the write request is stored in cache 109 and the H2P table may be updated when the page data is hardened to storage devices 106 during a destaging process.

The A2H and H2P tables described above are examples of what are more generally referred to herein as "mapping tables" of respective first and second distinct types. Other types and arrangements of mapping tables or other content-based signature mapping information may be used in other embodiments.

The logical address space illustratively comprises one or more ranges of logical block addresses or LBAs each comprising a LUN ID and an offset. For example, each LBA can identify a particular one of the user data pages 112. The LBAs each correspond to one or more physical blocks in the storage devices 106. Other types of LBAs and logical address spaces can be used in other embodiments. The term "logical address" as used herein is therefore intended to be broadly construed.

As indicated above, the storage controller 108, illustratively comprising the modules 108C, 108R and 108M as illustrated in FIG. 1 as well as additional modules such as data modules 108D, is configured to implement functionality for write cache release protection in the content addressable storage system 105.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for write cache release protection in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments, at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108, cache 109, and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for write cache release protection can be offered to cloud infrastructure customers or other users as a PaaS offering.

In illustrative embodiments, the control modules 108C are responsible for generating and maintaining the A2H mappings and storing data associated with incoming write requests in the write cache portion of cache 109 with a persistent copy backed up in write cache journal 116. The control modules 108C are also responsible for managing operations that involve the write cache, such as, e.g., a destage operation in which some or all of the data stored in the write cache is persisted to the storage devices 106 associated with a destination data module 108D.

Data modules 108D are responsible for managing operations involving the storage devices 106 including the physical storage of the data pages on the storage devices 106, e.g., as part of a destage operation, and generating and maintaining the H2P mappings.

In illustrative embodiments, a write request is split into a number of stages which may be synchronous or asynchronous.

Figure 2:
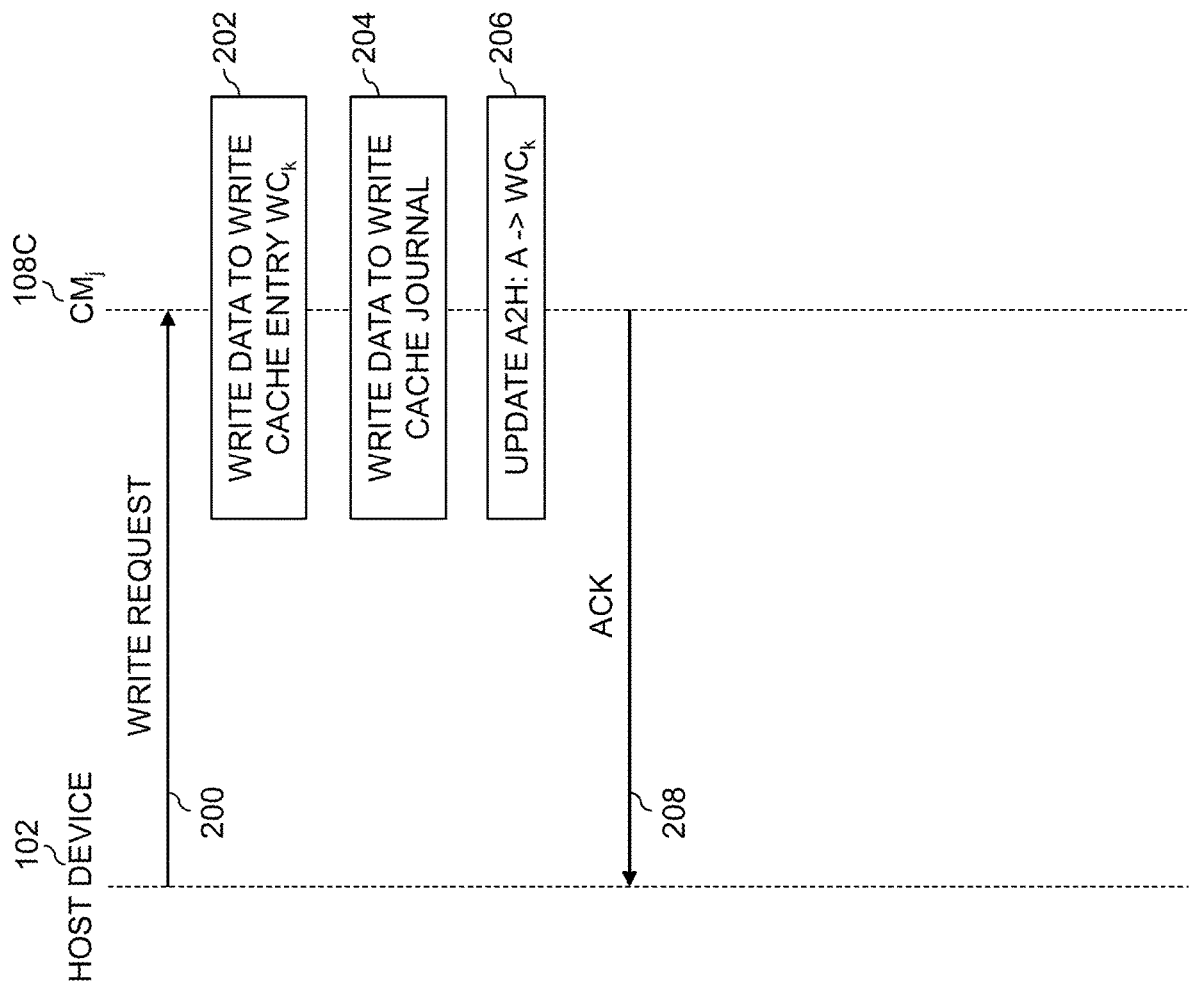
FIG. 2 is a sequence diagram illustrating a portion of an example sequence for handling a write request in an illustrative embodiment.

With reference to the sequence diagram of FIG. 2, for example, a first stage of a write request is handled by a given control module 108C, referred to in this example as control module j ($CM_j$).

At 200, $CM_j$ receives a write request from a host device 102, e.g., via network 104.

At 202, $CM_j$ writes the data associated with the received write request to the write cache portion of cache 109. For example, the control module 108C adds the data as a new entry in the write cache, e.g., entry $WC_k$.

At 204, the $CM_j$ also writes the data associated with the received write request to the write cache journal 116. In some embodiments, the data may be written to the write cache and the write cache journal 116 synchronously or asynchronously in any order.

At 206, $CM_j$ updates the A2H mapping for the logical address (A) associated with the write request to point to the entry in the write cache, e.g., A→$WC_k$.

At 208, $CM_j$ sends an acknowledgement to the write request to the host device 102.

Figure 3:
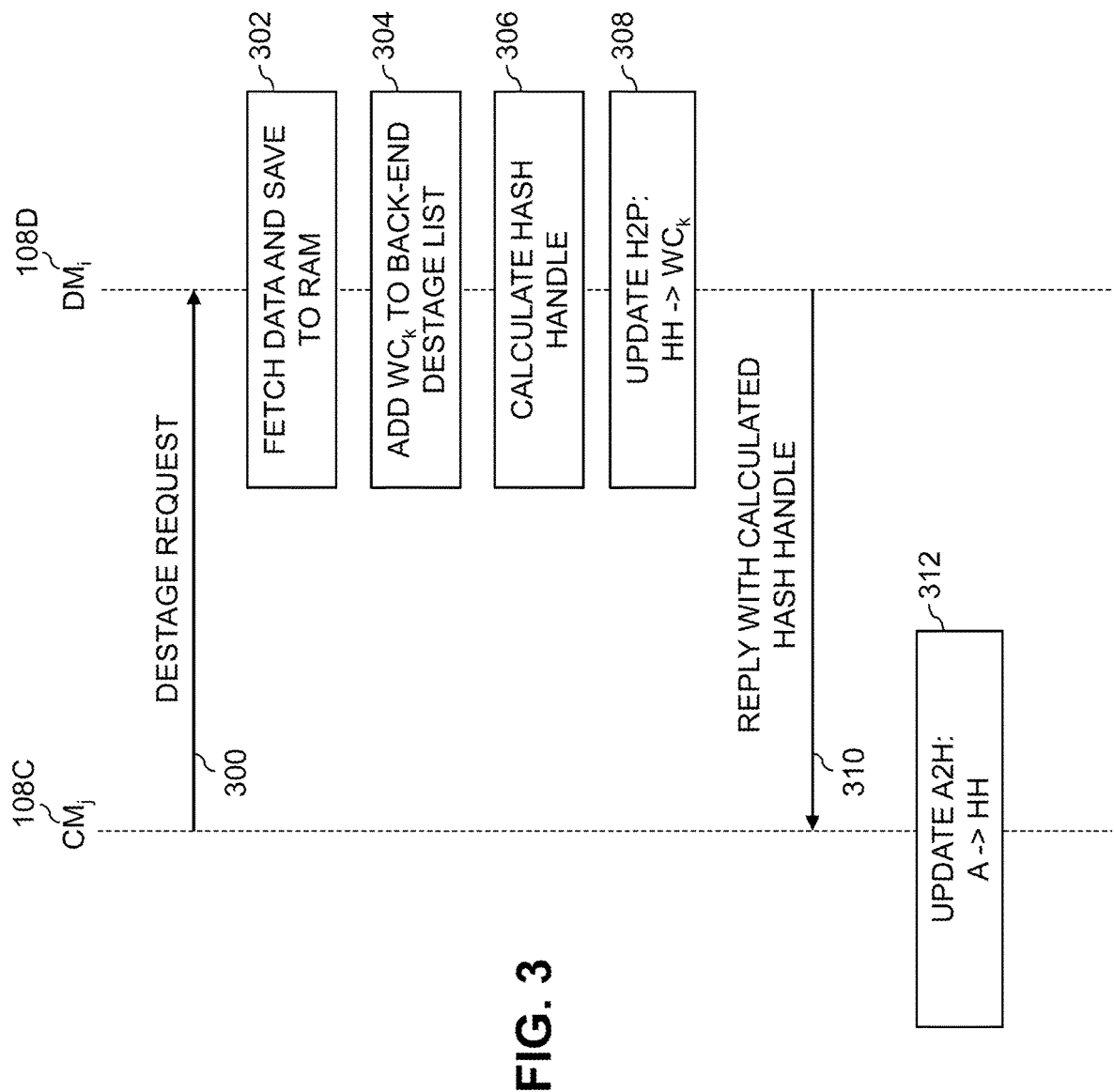
FIG. 3 is a sequence diagram illustrating another portion of the example sequence of FIG. 2 for handling a write request in an illustrative embodiment.

With reference to the sequence diagram of FIG. 3, for example, a second stage of a write request is handled by a given data module 108D, referred to in this example as data module i ($DM_i$). In illustrative embodiments, the second stage of the write request may be performed synchronously or asynchronously with the first stage.

At 300, $CM_j$ sends a destage request to Dn.

At 302, $DM_i$ fetches the data from the write cache and saves it to a volatile memory associated with $DM_i$, e.g., RAM or other volatile memory.

Figure 4:
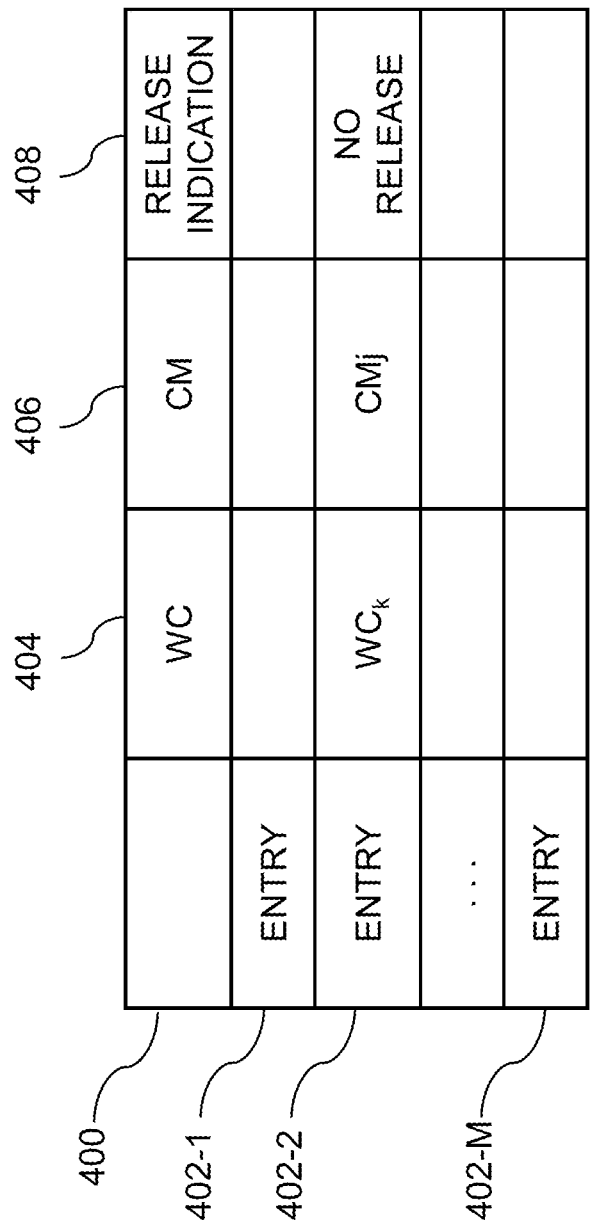
FIG. 4 is a diagram illustrating an example back-end destage data structure in an illustrative embodiment.

At 304, $DM_i$ adds an entry for the write cache entry, $WC_k$, to a back-end destage data structure 400, e.g., a list, table, or other data structure, for example, as illustrated in FIG. 4. For example, the back-end destage data structure 400 may comprise a plurality of entries 402-1, 402-2, ... 402-M, with each entry 402 comprising fields for one or more items of information. While entries 402-1 through 402-M are illustrated in FIG. 4, in some embodiments, a portion of the entries 402 may not contain any information. For example, in some embodiments, only a subset of the entries 402 in back-end destage data structure 400 may be required to service write requests, depending on the system load.

A given entry 402 may comprise a write cache entry field 404, a control module field 406, and a release indication 408.

In some embodiments, write cache entry field 404 contains information that identifies the corresponding write cache entry for which the given entry 402 has been added. For example, as illustrated in FIG. 4, entry 402-2 comprises a write cache entry field 404 value of $WC_k$ indicating that entry 402-2 is an entry corresponding to write cache entry $WC_k$.

In some embodiments, control module field 406 contains information that identifies the corresponding control module 108C for which the given entry 402 has been added. For example, as illustrated in FIG. 4, entry 402-2 comprises a control module field 404 value of $CM_j$ indicating that entry 402-2 is an entry corresponding to control module $CM_j$.

In some embodiments, release indication 408 contains information that identifies the release state of the corresponding write cache entry. As an example, entry 402-2 comprises a release indication 408 of NO RELEASE. In other examples, entry 402-2 may comprise a release indication 408 of RELEASE. In yet other example, entry 402-2 may comprise a release indication 408 having no information, e.g., a null or empty field. Any other information may be contained in the release indication 408.

In illustrative embodiments, a release indication 408 of RELEASE, null, empty, or other similar indications may be described herein as an example of a first value of the release indication 408.

In illustrative embodiments, a release indication 408 of NO RELEASE or other similar indications may be described herein as an example of a second value of the release indication 408.

The function of release indication 408 will be described in more detail below.

Referring back to the sequence diagram of FIG. 3, at 306, $DM_i$ calculates the content-based signature (HH), e.g., the hash handle or other content-based signature, for the data.

At 308, $DM_i$ updates the H2P mapping for the calculated content-based signature (HH) to point to the write cache entry, e.g., HH→$WC_k$.

At 310, $DM_i$ replies to $CM_j$ with the calculated HH.

At 312, $CM_j$ updates the A2H mapping for the logical address (A) associated with the write request to point to the content-based signature, e.g., A→HH.

At the completion of the second stage, the data associated with the write request is still not written to the storage devices 106. The data is stored in the volatile memories of the write cache, (e.g., entry $WC_k$), and data module, (e.g., $DM_i$), and is persisted in the write cache journal 116 for backup and recovery purposes.

Figure 5:
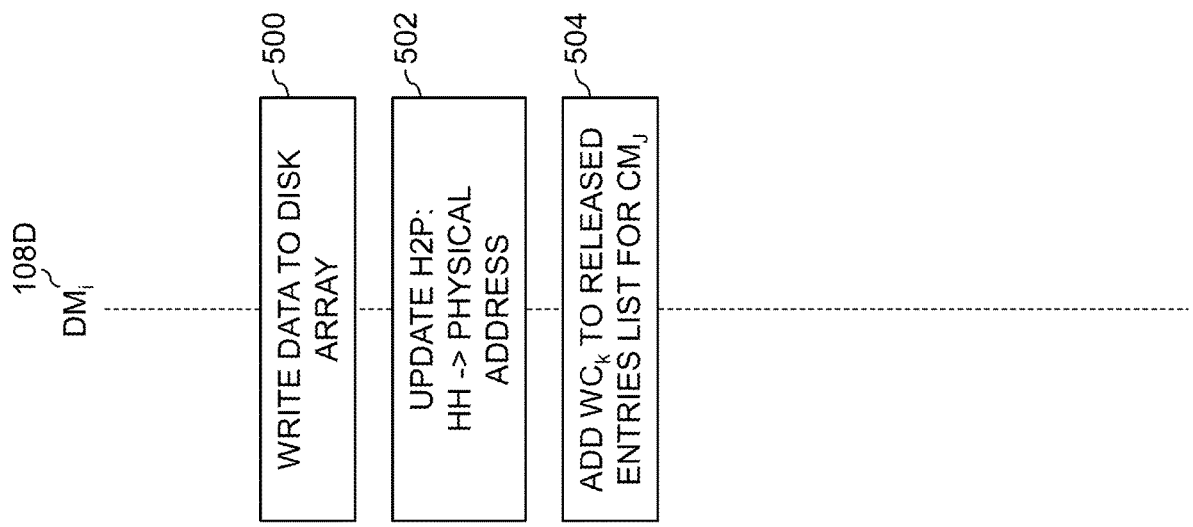
FIG. 5 is a sequence diagram illustrating another portion of the example sequence of FIG. 2 for handling a write request in an illustrative embodiment.

With reference to the sequence diagram of FIG. 5, for example, a third stage of a write request is handled by a given data module 108D, e.g., $DM_i$. In illustrative embodiments, the third stage of the write request may be performed synchronously or asynchronously with the first and second stages.

At 500, $DM_i$ persists the data to the storage devices 106, e.g., by writing the data to a physical address on the storage devices 106 based on the content-based signature or in another manner.

At 502, $DM_i$ updates the H2P mapping for the calculated content-based signature HH to point to the corresponding physical address at which the data has been stored, e.g., HH→Physical address.

Figure 6:
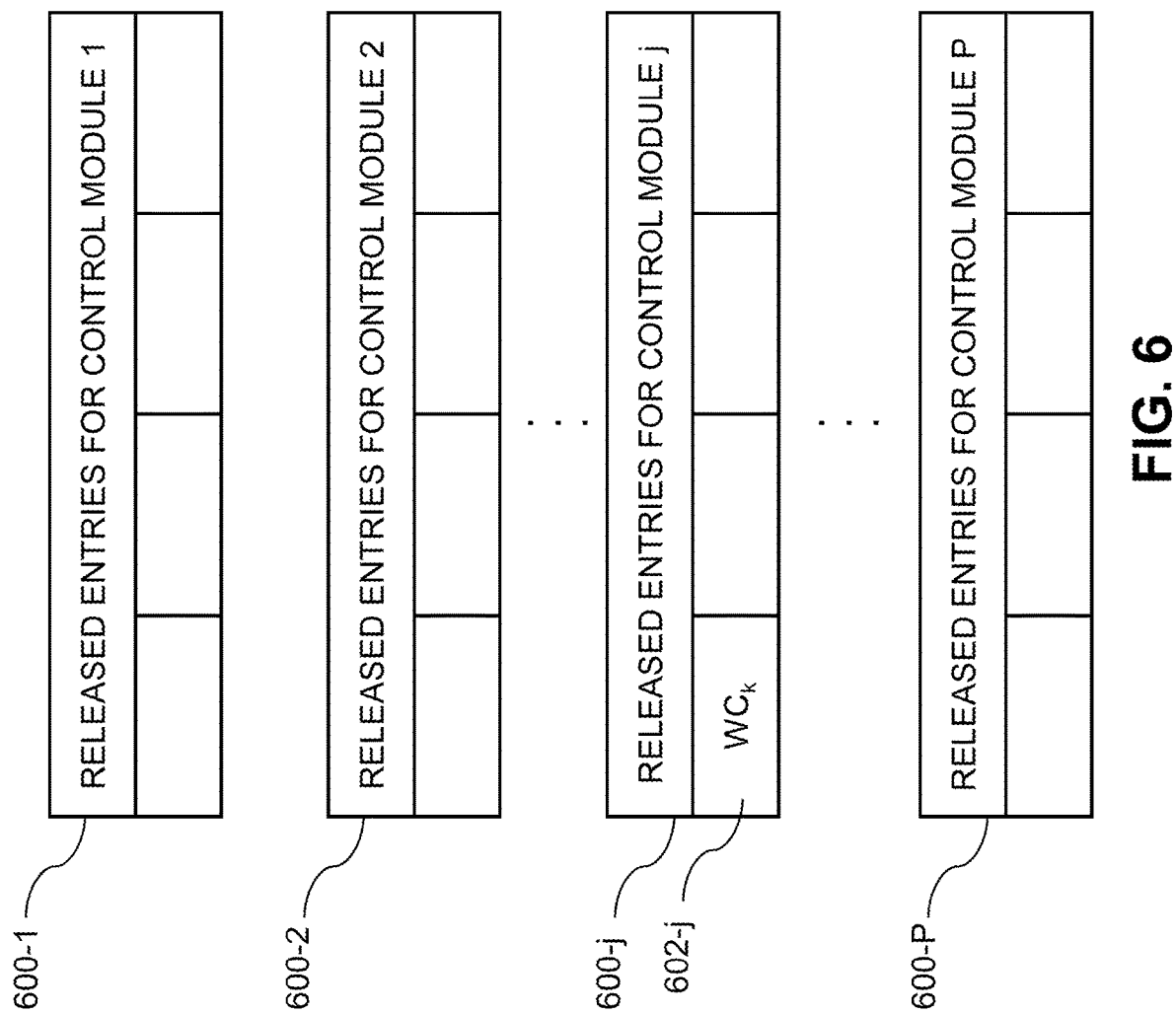
FIG. 6 is a diagram illustrating example released entries data structures in an illustrative embodiment.

At 504, $DM_i$ adds information for the corresponding write cache entry $WC_k$ to a released entries data structure 600 corresponding to the given control module 108, $CM_j$, for example, as illustrated in FIG. 6. For example, as illustrated in FIG. 6, in illustrative embodiments, a given data module 108D maintains a released entries data structure 600 for each associated control module 108C, e.g., released entries data structures 600-1, 600-2, . . . , 600-j, . . . 600-P. For example, $DM_i$ maintains a released entries data structure 600-j corresponding to $CM_j$ that include entries 602-j which comprise information indicating which corresponding write cache entries should be released by $CM_j$ after the corresponding data has been persisted to the storage devices 106. For example, entries 602-j indicate to CMj which write cache entries should be released, e.g., $WC_k$ in this example.

After the third stage, the data is persisted in the storage devices 106 so the corresponding write cache entry and its write cache journal entry are no longer needed.

Figure 7:
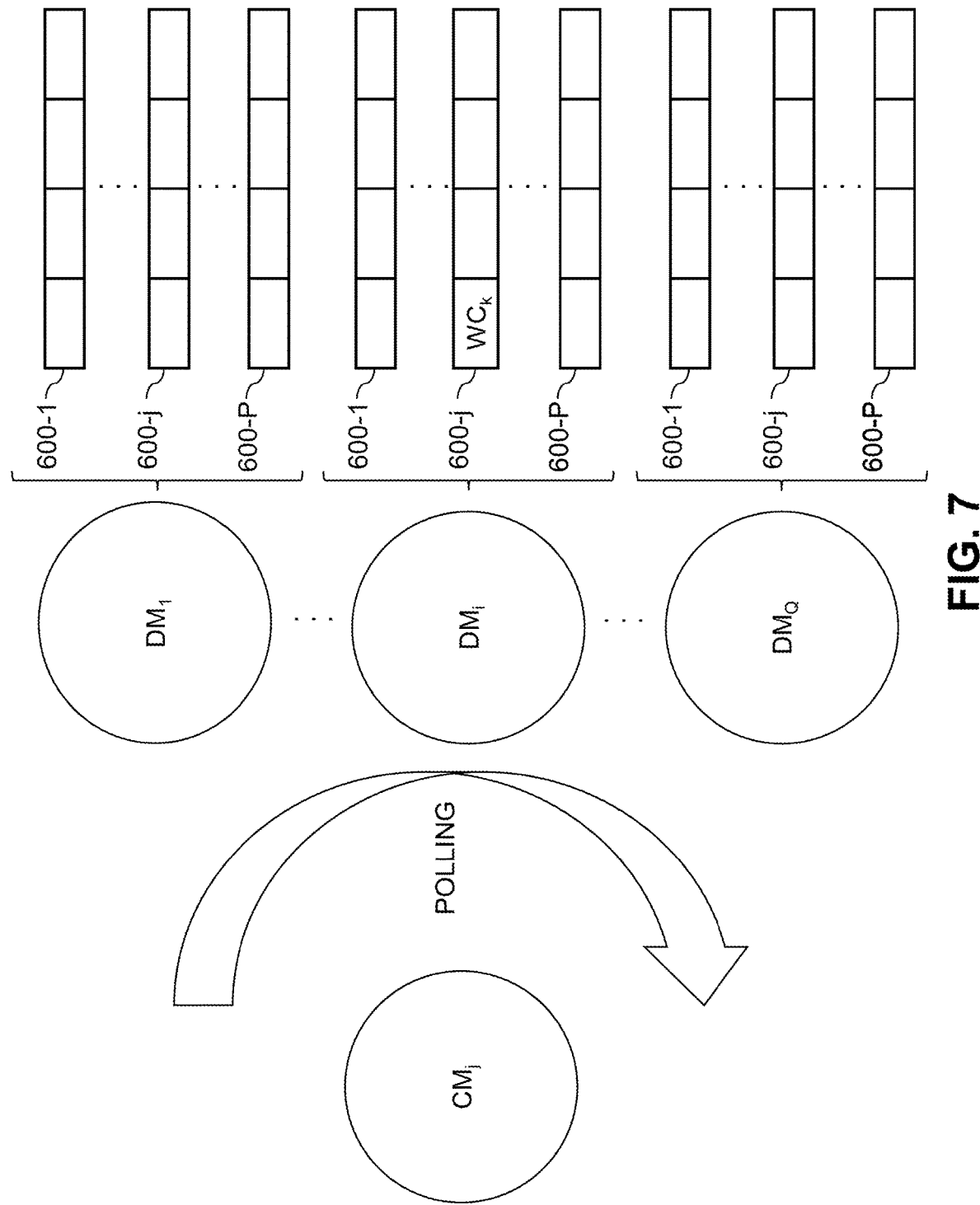
FIG. 7 is a diagram illustrating an example polling of released entries data structures by a control module in an illustrative embodiment.

With reference to the diagram of FIG. 7, for example, a fourth stage of a write request is handled by a given control module 108C, e.g., $CM_j$. In illustrative embodiments, the fourth stage of the write request may be performed synchronously or asynchronously with the first, second, and third stages.

In the fourth stage, the control module 108C polls the corresponding released entries data structures 600 of the associated data modules 108D to determine whether write cache entries under management of the control module 108C have been persisted to the storage devices 106. In some embodiments, the polling may be periodic. In some embodiments, the polling may be continuous. In some embodiments, any other method of polling may be used.

In an example scenario, control module $CM_j$ polls released data structures 600-j of associated data modules $DM_1$, . . . , $DM_i$, . . . $DM_Q$ to determine whether there are any entries 602 comprising information indicating a write cache entry to be released. With reference again to FIG. 6, for example, the released entries data structure 600-j maintained by $DM_i$ comprises an entry 602-j with information indicating that the write cache entry $WC_k$ has been persisted to the storage devices 106 and is ready to be released. $CM_j$ then releases the data from write cache entry $WC_k$ and the write cache journal 116, freeing up the write cache entry for use in new write requests.

While the process of servicing a write request is described above with respect to a plurality of stages, e.g., the first stage through the fourth stage, any number of stages may be implemented. In addition, fewer stages or additional stages including fewer or additional steps may be utilized to service a write request.

In some embodiments, a given control module 108C may fail, e.g., due to a disconnect, hardware failure, or other similar issue, or may otherwise need to be restarted. When a control module 108C restarts, it recovers the state of the associated inflight write cache entries. In some embodiments, however, the given control module 108C may restart after polling the released entries data structure 600 of an associated data module 108D but before releasing any indicated write cache entries from the write cache.

In an example scenario, data associated with a given write cache entry is persisted to the storage devices 106 and the information indicating that the given write cache entry should be released is added to the released entries data structure 600 associated with the given control module 108C. The given control module 108C polls the released entries data structure 600 and fetches the information but restarts before releasing write cache entry. Since the information has already been fetched, the released entries data structure 600 no longer contains the information and subsequent polling after restart by the control module 108C will not find that information in the corresponding release entries data structure 600. In this example scenario, the write cache entry will not be released, which may lead to a loss of the ability of the storage system to utilize the write cache entry, reducing the resources available for processing new write requests.

In addition, during a recovery procedure after a given control module 108C restarts, the given control module 108C performs a retransmit operation in which all inflight write cache entries are retransmitted to their destination data modules 108D. For example, control module 108C may check the write cache journal 116 to determine which write cache entries were inflight at the time of the restart. The data modules 108D check their H2P mappings to determine if the data associated with these inflight write cache entries have been persisted to the storage devices 106 and respond to the control module 108C accordingly. If the response from the data module 108D indicates that the data was persisted, the control module 108C releases the associated write cache entry.

In the above examples, there are two asynchronous independent flows that may release a write cache entry. In the first flow, the control module 108C polls the corresponding released entries data structures 600 of the data modules 108D for information indicating that a given write cache entry has been persisted to the storage devices 106 and is ready to be released. The control module 108C then releases any such write cache entries. In the second flow, the restarted control module 108C retransmits an inflight write request to an associated data module 108D and receives a response indicating that the inflight write request has been persisted to the storage devices 106. The control module 108C then releases the corresponding write cache entry from the write cache.

A race between these flows may mistakenly free a write cache entry that was re-allocated for a different write request, which may cause a loss of data. For example, if the write cache entry has been persisted by the data module 108D and added to the released entries data structure 600 and a given control module 108C fails and restarts, the control module 108C, after restart, performs both flows in parallel. For example, the restarted control module 108C polls the released entries data structure 600 and finds the information indicating that the given write cache entry has been persisted while also retransmitting the inflight write request corresponding to that given cache entry to the data module 108D.

In such a scenario, the control module 108C may release the given write cache entry based on the polling finding the information indicating that the write cache request is ready to be released in the released entries data structure 600. The given write cache entry is then freed up and reallocated for use by a new write request. Asynchronously, the control module 108C may also release the given write cache entry as part of the retransmit operation when a response is received from the data module 108D indicating that the inflight write request has already been persisted to the storage devices 106, which may result in the data associated with the new write request being released from the write cache entry before the data is persisted. This double release of the write cache entry for the same write request may be performed in either order, depending on which operation, polling or retransmit, releases the write cache entry first. The result of such a double release may include a loss of data on the system, as the data associated with the new write request has not yet been persisted to the storage devices 106.

The operation of the information processing system 100 will now be further described with reference to the flow diagrams of FIGS. 8-10. FIGS. 8-10 more particularly show example processes for write cache release protection implemented in a storage system such as the content addressable storage system 105 of the FIG. 1 embodiment. The process as shown in FIG. 8 includes steps 800 through 804 and illustrates functionality performed by a data module 108D in conjunction with a failure of a control module 108C in accordance with the write cache release protection logic 114.

Figure 8:
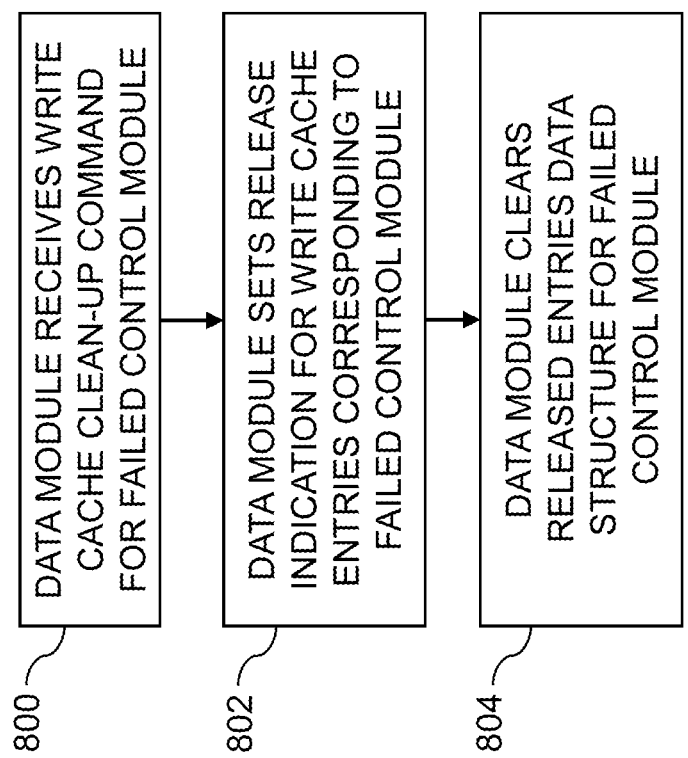
FIG. 8 is a flow diagram of an example process performed by a data module in response to a write cache clean-up command in an illustrative embodiment.
Figure 9:
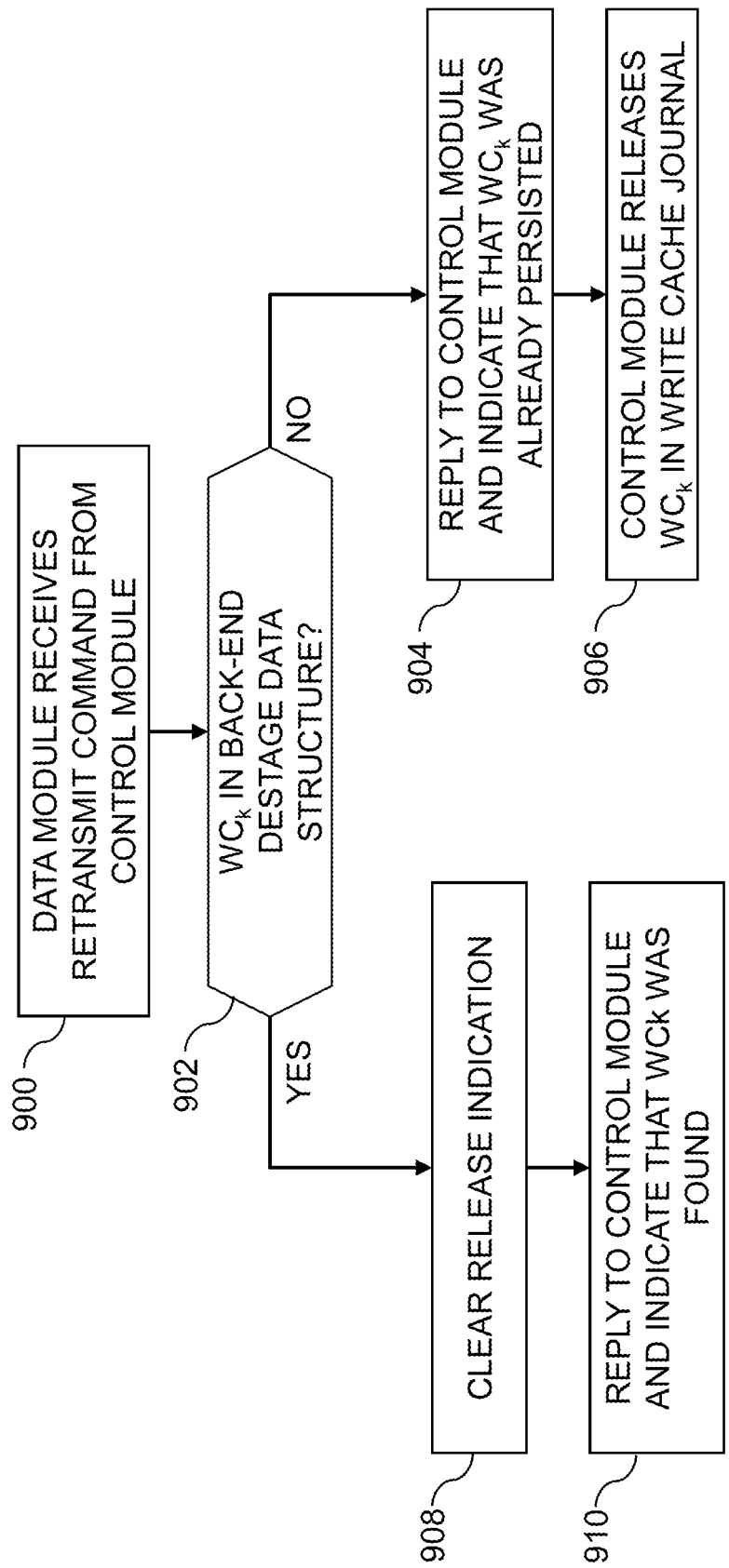
FIG. 9 is a flow diagram of an example process performed by a data module in response to a retransmit command in an illustrative embodiment.

The process as shown in FIG. 9 includes steps 900 through 910 and illustrates functionality performed by a data module 108D in conjunction with a retransmit operation in accordance with the write cache release protection logic 114. The process as shown in FIG. 10 includes steps 1000 through 1006 and illustrates functionality performed by a data module 108D in conjunction with the persisting of the data associated with the write cache entry to the storage devices 106 in accordance with the write cache release protection logic 114. The processes shown in FIGS. 8-10 are suitable for use in the system 100 but are more generally applicable to other types of information processing systems each comprising one or more storage systems. The steps are illustratively performed by cooperative interaction of control logic instances of processing modules of a distributed storage controller. A given such storage controller can therefore comprise a distributed storage controller implemented in the manner illustrated in FIGS. 1-7.

With reference now to FIG. 8, the functionality performed by a data module 108D in conjunction with a failure of a control module 108C in accordance with the write cache release protection logic 114 will now be described.

At 800, a given data module 108D receives a clean-up command in response to a failed control module 108C. For example, a system manager such as, e.g., management module 108M, may command the data module 108D to perform a clean-up operation in response to a failure of a control module 108C such as, e.g., a network disconnection or other similar failure. For example, in some embodiments, the clean-up operation may be considered to be part of a network disconnection handling operation for the failed control module 108C such that the clean-up operation is performed before any new operations are executed upon restart of the control module 108C.

In some embodiments, the system manager sends the clean-up command to each data module 108D in the network that is associated with the failed control module 108C. In some embodiments, the clean-up command may be sent to a subset of the data modules 108D in the network.

At 802, the given data module 108D sets the release indication 408 in the corresponding entry 402 of the back-end destage data structure 400 for each write cache entry associated with the failed control module 108C that has not yet been persisted to the storage devices 106. For example, the release indication 408 may be set to NO RELEASE for write cache entries that have not yet been persisted. In some embodiments, the given data module 108D may set the release indication 408 in the corresponding entry 402 of the back-end destage data structure 400 for each write cache entry associated with the failed control module 108C that has been persisted to the storage devices 106 to a value such as, e.g., RELEASE, null, empty, or another similar value that indicates that the write cache entry has been persisted. In some embodiments no setting is necessary to indicate that the write cache entry has been persisted where, for example, the release indication 408 of an entry added to the back-end destage data structure 400 may be initialized to the RELEASE, null, empty, or other similar value. In some embodiments, the value of release indication 408 may be binary where, for example, a value of 0 may indicate that the write cache entry should be released and a value of 1 may indicate that the write cache entry should not be released, or vice versa. Any other indication may be used.

At 804, the data module 108D clears the released entries data structure 600 corresponding to the failed control module 108C. For example, by clearing the released entries data structure 600, new polling by the control module 108C on restart will not cause a release of the corresponding write cache entry even though it has been persisted to the storage devices 106. Instead, the retransmit command, described above, will release that write cache entry since the data module 108D will indicate that the data associated with the write cache entry has been persisted to the storage devices 106.

After the clean-up operation is completed, e.g., for all associated data modules 108D, the system manager restarts the failed control module 108C. After restart, the control module 108C starts the retransmit process which will send a retransmit command for each write cache entry that was previously destaged to a destination data module 108D.

With reference now to FIG. 9, the functionality performed by a given data module 108D in conjunction with a retransmit operation in accordance with the write cache release protection logic 114 will now be described.

At 900, a given data module 108D receives a retransmit command from the failed control module 108C after restart of the failed control module 108C. In some embodiments, the given data module 108D may receive a separate retransmit command for each inflight write cache entry that is associated with that data module 108D.

At 902, the data module 108D determines whether the write cache entry has been persisted to the storage devices 106. For example, data module 108D determines whether or not there is an entry in the back-end destage data structure 400 corresponding to the write cache entry that is the subject of the retransmit command.

If the corresponding entry is not found in the back-end destage data structure 400, this means that the write cache entry was already persisted to the storage devices 106. In such a case, the data module 108D responds to the retransmit command with an indication that the write cache entry was already persisted at 904. The control module 108C then releases the write cache entry, e.g., from the write cache and the write cache journal 116 at 906.

Returning to step 902, if the corresponding entry is found in the back-end destage data structure 400, this means that it is still not persisted and is marked with a release indication 408 of NO RELEASE, e.g., a second value. The data module 108D will clear release indication 408, e.g., set it to RELEASE, empty, null, or another similar value, at 908. By clearing the release indication 408 in conjunction with the retransmit command for write cache entries that have not yet been persisted to the storage devices 106, the data module 108D ensures that those write cache entries will be added to the released entries data structure 600 when persisted, as described below with reference to FIG. 10, and will be released during completion polling by the control module 108C.

At 910, the data module 108D responds to the retransmit command with an indication that the write cache entry was found in the back-end destage data structure 400. In this case the control module 108C will not release the write cache entry as it is still in the destage process. The control module 108C will instead wait until the information indicating that the write cache entry is ready for release is added to the released entries data structure 600.

Figure 10:
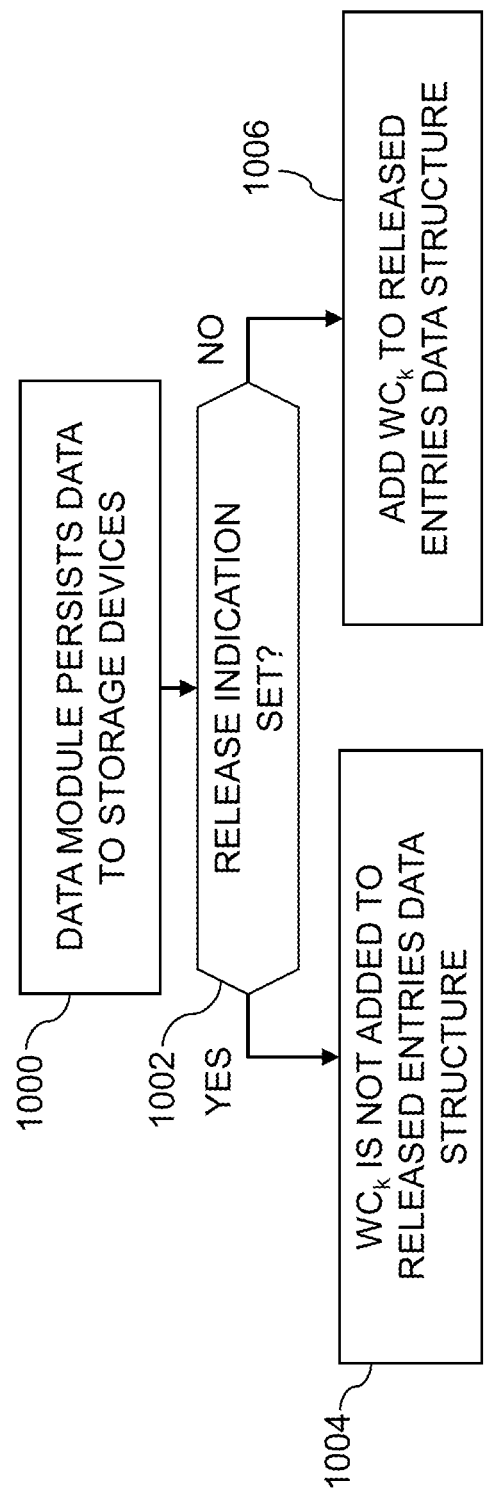
FIG. 10 is a flow diagram of an example process performed by a data module for destaging data to storage devices in an illustrative embodiment.

With reference now to FIG. 10, the functionality performed by a data module 108D in conjunction with persisting data associated with a write cache entry to the storage devices 106 in accordance with the write cache release protection logic 114 will now be described.

At 1000, a given data module 108D persists data associated with a write cache entry to the storage devices 106.

At 1002, the given data module 108D determines whether or not the release indication 408 is set to the second value in the corresponding back-end destage data structure 400, e.g., set to NO RELEASE.

At 1004, if the release indication 408 is set to the second value in the corresponding entry 402 of back-end destage data structure 400, the information indicating that that write cache entry is ready for release is not added to the released entries data structure 600. For example, even though the data associated with the write cache entry, $WC_k$, has been persisted to the storage devices 106, the released entries data structure 600 for the corresponding control module $CM_j$ is not updated to include an entry having the information indicating that that write cache entry $WC_k$ is ready for release when the corresponding release indication 408 is set to the second value, e.g., NO RELEASE. As noted above, this will inhibit the control module $CM_j$ from inadvertently releasing the corresponding write cache entry $WC_k$ more than once, i.e., during polling and as part of the retransmit process.

Returning back to step 1002, if the corresponding release indication 408 is not set, e.g., the value is the first value, RELEASE, null, empty, or other similar values, the information indicating that that write cache entry is ready for release is added to the corresponding released entries data structure 600 at 1006. For example, an entry for $WC_k$ may be added to the released entries data structure 600. Because the entry $WC_k$ has been added to the released entries data structure 600 in this case, the write cache entry $WC_k$ will be release during the normal polling operation of the control module $CM_j$ after restart.

As described above with reference to FIGS. 8-10, the write cache release protection logic 114 ensures that a write cache entry that was persisted to the storage devices 106 before the control module 108C was restarted will be released by the control module 108C only in the retransmit operation.

In addition, the write cache release protection logic 114 ensures that write cache entries that were not persisted to the storage devices 106 before the control module 108C was restarted will be marked with a release indication 408 of a second value, e.g., NO RELEASE, and will be released in one of the following circumstances. In the first circumstance, if a retransmit command for the write cache entry happens before the corresponding data page is persisted, the release indication 408 will be cleared and the write cache entry will be released through completion polling by the control module 108C, as described above. In the second circumstance, if a retransmit command for the write cache entry happens after the corresponding data is persisted, the write cache entry will be released through the retransmit operation.

The write cache release protection logic 114 ensures that a write cache entry will be released only through one path, after ensuring that the associated data is persisted to the storage devices 106. This logic inhibits a failed control module 108C from mistakenly releasing a write cache entry twice on restart after failure which may cause an unintentional release of an additional write cache entry that has not yet been persisted.

It is also to be appreciated that the processes of FIGS. 8-10 and other features and functionality for write cache release protection as described above can be adapted for use with other types of information systems, including by way of example an information processing system in which the host devices and the storage system are both implemented on the same processing platform.

The particular processing operations and other system functionality described in conjunction with the flow diagrams of FIGS. 8-10 are presented by way of illustrative example only and should not be construed as limiting the scope of the disclosure in any way. Alternative embodiments can use other types of processing operations for implementing write cache release protection. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different process instances for write cache release protection for respective different storage systems or portions thereof within a given information processing system.

Functionality such as that described in conjunction with the flow diagrams of FIGS. 8-10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the processes of FIGS. 8-10 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array suitably modified to incorporate techniques for write cache release protection as disclosed herein.

As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement functionality for write cache release protection in accordance with the processes of FIGS. 8-10.

The techniques for write cache release protection implemented in the embodiments described above can be varied in other embodiments. For example, different types of process operations can be used in other embodiments.

In addition, the above-described functionality associated with C-module, D-module, R-module and write cache release protection logic components of an XtremIO™ storage array can be incorporated into other processing modules or components of a centralized or distributed storage controller in other types of storage systems.

Illustrative embodiments of content addressable storage systems or other types of storage systems with functionality for write cache release protection as disclosed herein can provide a number of significant advantages relative to conventional arrangements.

For example, some embodiments can advantageously inhibit the mistaken release of write cache entries that have not yet been persisted to the storage devices due to a restart of a failed control module which an inadvertent prevents loss of data.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
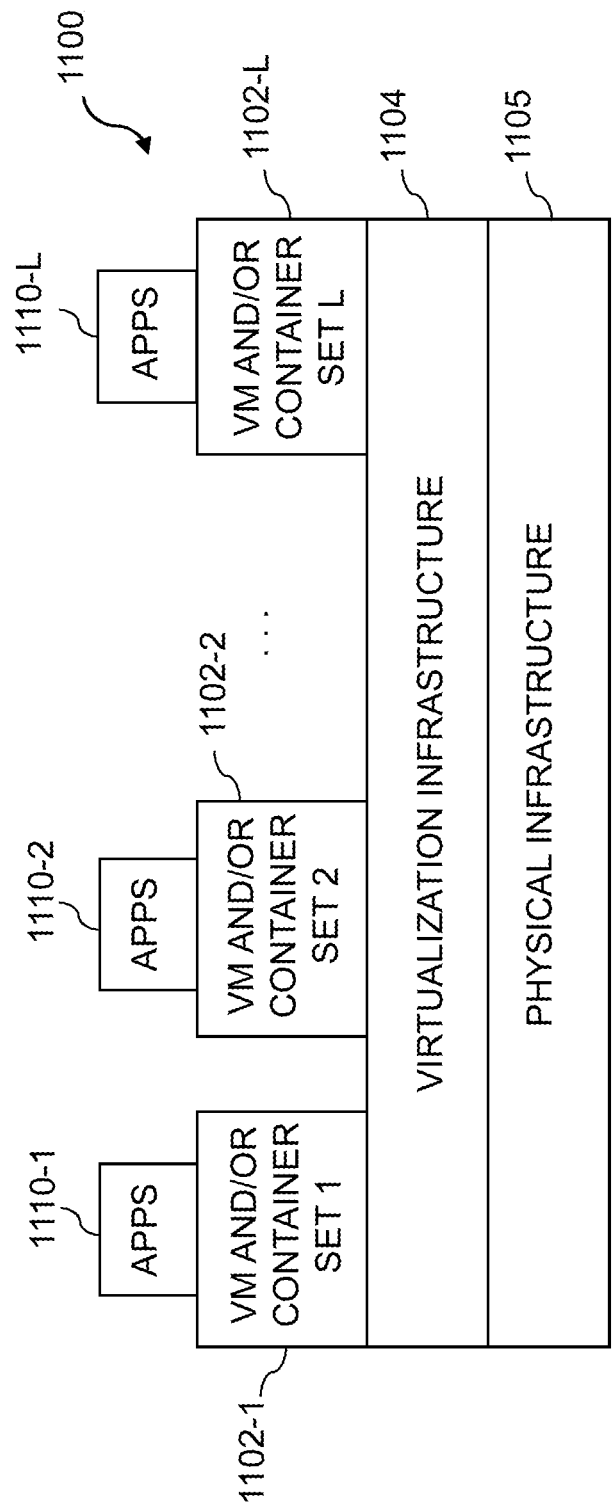
FIGS. 11 and 12 show examples of processing platforms that may be utilized to implement at least a portion of an information processing system in illustrative embodiments.
Figure 12:
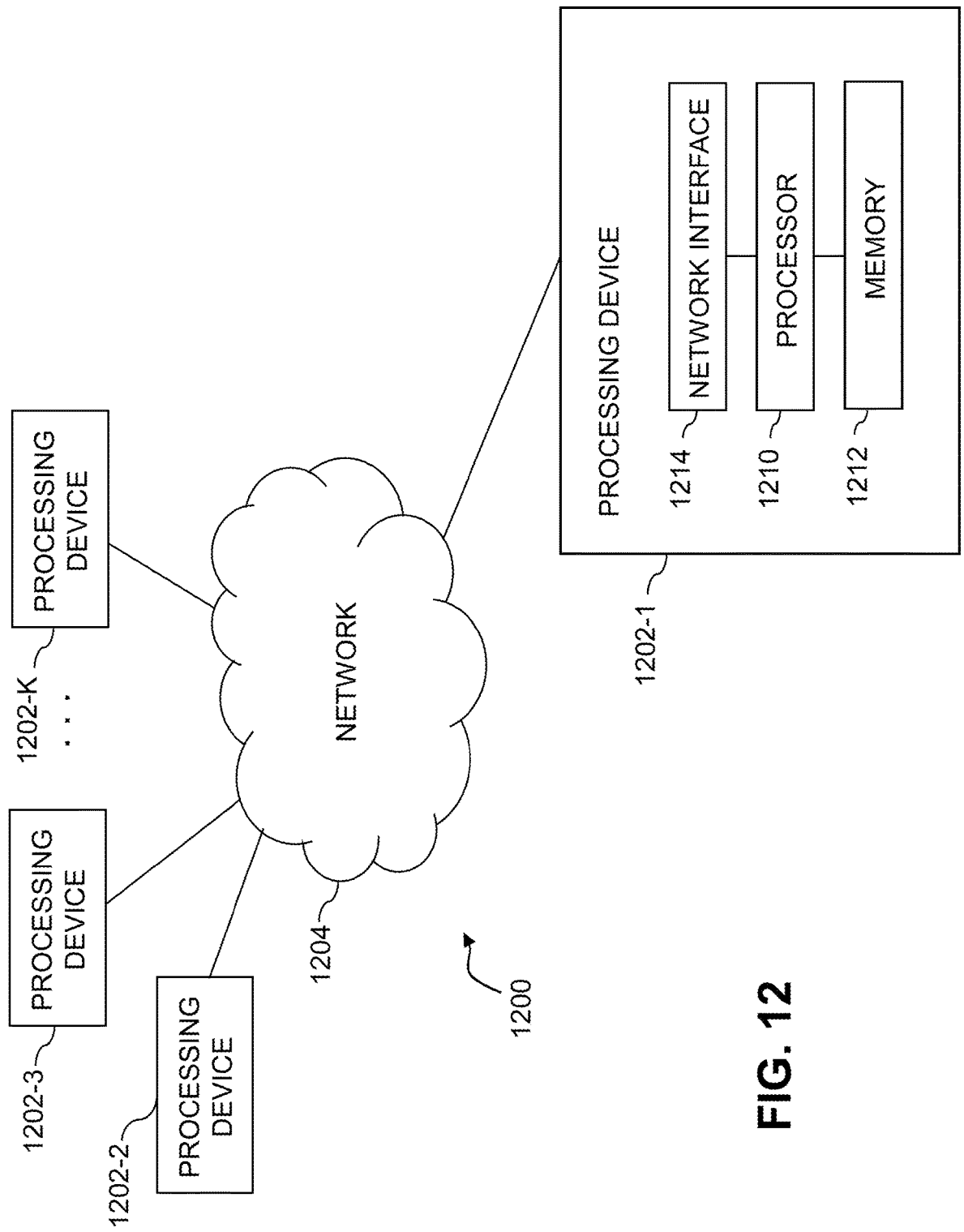

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide write cache release protection functionality of the type described above for one or more processes running on a given one of the VMs. For example, each of the VMs can implement write cache release protection functionality for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide write cache release protection functionality of the type described above for one or more processes running on different ones of the containers. For example, a container host device supporting multiple containers of one or more container sets can implement one or more instances of write cache release protection logic for use in protecting a write cache from a double release of an entry when a control module restarts.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that, in other embodiments, different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controller 108 of system 100 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, processing modules, write cache release protection processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and at least one processing device coupled to memory, wherein the at least one processing device is configured, in conjunction with destaging data corresponding to an entry in a write cache to one or more of the plurality of storage devices:
to determine a value of a release indication of an entry in a destage data structure, the entry in the destage data structure corresponding to the entry in the write cache; and
responsive to determining that the value of the release indication is a first value, to add an entry that corresponds to the entry in the write cache to a release data structure, the storage system being configured to poll the release data structure and to release entries in the write cache that correspond to entries found in the release data structure by the polling,
wherein responsive to determining that the value of the release indication is a second value, an entry corresponding to the entry in the write cache is not added to the release data structure.

2. The apparatus of claim 1 wherein the at least one processing devices is further configured, responsive to a failure of a portion of the storage system associated with the entry in the write cache, to set the release indication of the corresponding entry in the destage data structure to the second value.

3. The apparatus of claim 2
wherein the storage system comprises a distributed storage system, the at least one processing device comprising a plurality of control modules and a plurality of data modules,
wherein the portion of the storage system comprises at least one of the control modules, and
wherein the setting of the release indication to the second value is performed by the at least one of the data modules.

4. The apparatus of claim 3 wherein the entry in the destage data structure comprises:
information identifying the corresponding entry in the write cache;
information identifying the at least one of the control modules; and
the release indication.

5. The apparatus of claim 1
wherein the release data structure corresponds to a portion of the storage system, and
wherein the at least one processing device is further configured, responsive to a failure of the portion of the storage system, to clear entries found in the release data structure corresponding to the portion of the storage system.

6. The apparatus of claim 1 wherein the at least one processing device is further configured:
to obtain, from a portion of the storage system that has restarted, a retransmission of the entry in write cache;
to determine whether or not the entry corresponding to the entry in the write cache is included in the destage data structure;
responsive to determining that the corresponding entry is included in the destage data structure, to set the release indication to the first value; and
responsive to determining that the corresponding entry is not included in the destage data structure, to indicate to the portion of the storage system that the data corresponding to the entry in the write cache has been destaged to one or more of the plurality of storage devices.

7. The apparatus of claim 6 wherein, responsive to the indication that the data corresponding to the entry in the write cache has been destaged to one or more of the plurality of storage devices, the portion of the storage system is configured to release the entry in the write cache.

8. A method comprising:
in conjunction with destaging data corresponding to an entry in a write cache to one or more of a plurality of storage devices of a storage system:
determining a value of a release indication of an entry in a destage data structure, the entry in the destage data structure corresponding to the entry in the write cache; and
responsive to determining that the value of the release indication is a first value, adding an entry that corresponds to the entry in the write cache to a release data structure, the storage system being configured to poll the release data structure and to release entries in the write cache that correspond to entries found in the release data structure by the polling,
wherein responsive to determining that the value of the release indication is a second value, an entry corresponding to the entry in the write cache is not added to the release data structure,
wherein the method is implemented by at least one processing device comprising a processor coupled to a memory.

9. The method of claim 8 wherein the method further comprises, responsive to a failure of a portion of the storage system associated with the entry in the write cache, setting the release indication of the corresponding entry in the destage data structure to the second value.

10. The method of claim 9
wherein the storage system comprises a distributed storage system, the at least one processing device comprising a plurality of control modules and a plurality of data modules,
wherein the portion of the storage system comprises at least one of the control modules, and
wherein the setting of the release indication to the second value is performed by the at least one of the data modules.

11. The method of claim 10 wherein the entry in the destage data structure comprises:
information identifying the corresponding entry in the write cache;
information identifying the at least one of the control modules; and
the release indication.

12. The method of claim 8
wherein the release data structure corresponds to a portion of the storage system, and
wherein the method further comprises, responsive to a failure of the portion of the storage system, clearing entries found in the release data structure corresponding to the portion of the storage system.

13. The method of claim 8 the method further comprises:
obtaining, from a portion of the storage system that has restarted, a retransmission of the entry in write cache;
determining whether or not the entry corresponding to the entry in the write cache is included in the destage data structure;
responsive to determining that the corresponding entry is included in the destage data structure, setting the release indication to the first value; and
responsive to determining that the corresponding entry is not included in the destage data structure, indicating to the portion of the storage system that the data corresponding to the entry in the write cache has been destaged to one or more of the plurality of storage devices.

14. The method of claim 13 wherein, responsive to the indication that the data corresponding to the entry in the write cache has been destaged to one or more of the plurality of storage devices, the portion of the storage system releases the entry in the write cache.

15. A computer program product comprising a non-transitory processor-readable storage medium having stored therein program code of one or more software programs, wherein the program code when executed by at least one processing device causes said at least one processing device to:
in conjunction with destaging data corresponding to an entry in a write cache to one or more of a plurality of storage devices of a storage system:
to determine a value of a release indication of an entry in a destage data structure, the entry in the destage data structure corresponding to the entry in the write cache; and
responsive to determining that the value of the release indication is a first value, to add an entry that corresponds to the entry in the write cache to a release data structure, the storage system being configured to poll the release data structure and to release entries in the write cache that correspond to entries found in the release data structure by the polling,
wherein responsive to determining that the value of the release indication is a second value, an entry corresponding to the entry in the write cache is not added to the release data structure.

16. The computer program product of claim 15 the program code when executed by at least one processing device further causes the at least one processing device, responsive to a failure of a portion of the storage system associated with the entry in the write cache, to set the release indication of the corresponding entry in the destage data structure to the second value.

17. The computer program product of claim 16
wherein the storage system comprises a distributed storage system, the at least one processing device comprising a plurality of control modules and a plurality of data modules,
wherein the portion of the storage system comprises at least one of the control modules,
wherein the setting of the release indication to the second value is performed by the at least one of the data modules, and
wherein the entry in the destage data structure comprises:
information identifying the corresponding entry in the write cache;
information identifying the at least one of the control modules; and
the release indication.

18. The computer program product of claim 15
wherein the release data structure corresponds to a portion of the storage system, and
wherein the at least one processing device is further configured, responsive to a failure of the portion of the storage system, to clear entries found in the release data structure corresponding to the portion of the storage system.

19. The computer program product of claim 15 the program code when executed by at least one processing device further causes the at least one processing device:
to obtain, from a portion of the storage system that has restarted, a retransmission of the entry in write cache;

to determine whether or not the entry corresponding to the entry in the write cache is included in the destage data structure;

responsive to determining that the corresponding entry is included in the destage data structure, to set the release indication to the first value; and responsive to determining that the corresponding entry is not included in the destage data structure, to indicate to the portion of the storage system that the data corresponding to the entry in the write cache has been destaged to one or more of the plurality of storage devices.

20. The computer program product of claim 19 wherein, responsive to the indication that the data corresponding to the entry in the write cache has been destaged to one or more of the plurality of storage devices, the portion of the storage system is configured to release the entry in the write cache.

* * * * *